United States Patent
Porter et al.

(10) Patent No.: US 6,264,058 B1
(45) Date of Patent: Jul. 24, 2001

(54) LIMITED FLOW CUP

(76) Inventors: Jerry Porter; Barbara Y. Porter, both of 2818 Jutland Rd., Kensington, MD (US) 20895

( * ) Notice: Subject to any disclaimer, the term of this patent is extended or adjusted under 35 U.S.C. 154(b) by 0 days.

(21) Appl. No.: 09/384,296

(22) Filed: Aug. 26, 1999

Related U.S. Application Data

(60) Provisional application No. 60/098,144, filed on Aug. 27, 1998.

(51) Int. Cl.[7] .............................. A47G 19/22; G01F 11/26
(52) U.S. Cl. ......................... 220/709; 220/703; 222/456; 222/464.1
(58) Field of Search ..................................... 220/709, 703, 220/705, 714; 222/456, 464.1; 239/24, 33; 604/78, 248, 514

(56) References Cited

U.S. PATENT DOCUMENTS

| | | |
|---|---|---|
| 2,148,421 | 2/1939 | Allan . |
| 2,218,681 * | 10/1940 | Laux ...................... 239/24 |
| 2,460,542 * | 2/1949 | Smith .................... 239/33 X |
| 3,107,031 * | 10/1963 | Adams .................. 222/464.1 X |
| 4,424,921 * | 1/1984 | Feuerstein et al. .......... 222/456 |
| 4,684,045 * | 8/1987 | Su ........................ 222/456 |
| 4,828,149 * | 5/1989 | Hester .................... 222/207 |
| 4,948,499 * | 8/1990 | Peranio .................. 210/180 |
| 5,222,940 | 6/1993 | Wilk . |
| 5,323,928 | 6/1994 | Stevens . |
| 5,431,297 * | 7/1995 | Rosello ................. 220/706 |
| 5,632,407 * | 5/1997 | Christensen ............ 220/703 X |
| 5,810,210 * | 9/1998 | Kelley et al. ............. 222/456 |

FOREIGN PATENT DOCUMENTS

| | | |
|---|---|---|
| 753767 * | 10/1933 | (FR) . |
| 460765 * | 3/1934 | (FR) . |
| 27439 * | 3/1910 | (GB) . |
| 241074 * | 10/1925 | (GB) . |

* cited by examiner

Primary Examiner—Allan N. Shoap
Assistant Examiner—Joe Merek
(74) Attorney, Agent, or Firm—Sheldon H. Parker

(57) ABSTRACT

A container for dispensing a predetermined amount of liquid through a dispensing tube is disclosed. A valve is dimensioned to contain and dispense a predetermined about of liquid and dispense the liquid through a dispensing tube in contact with the valve. The liquid is in fluid contact with the inlet port when the base is in a first position and out of fluid contact with the inlet port when the base is in a second position. Thus, the valve fills with liquid when the container is in a substantially horizontal position while angling the container removes the liquid from contact with the valve and stops the fluid flow. Preferably the container has a sealable, watertight lid that receives the dispensing tube and incorporates vent holes to enable airflow into the container. The fluid inlet port can be placed in the side or top of the valve. The valve can alternatively be a tube with fluid and tube inlets in fluid communication. An air vent can be incorporated within the dispensing tube to prevent using the dispensing tube as a straw, it is preferable to include a drinking shield.

15 Claims, 12 Drawing Sheets

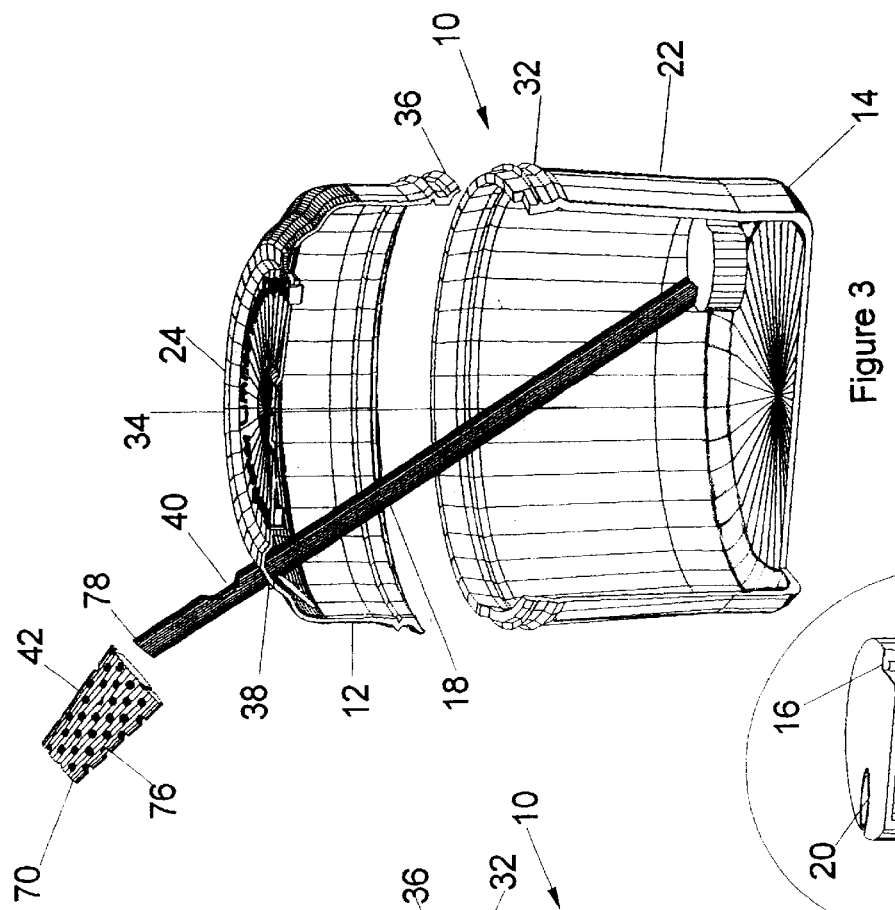
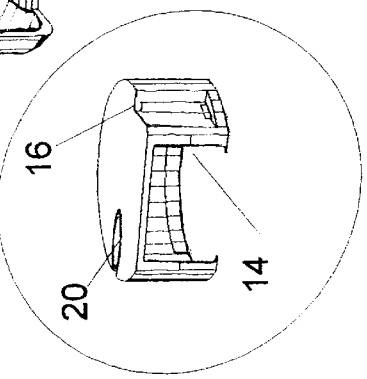
Figure 2
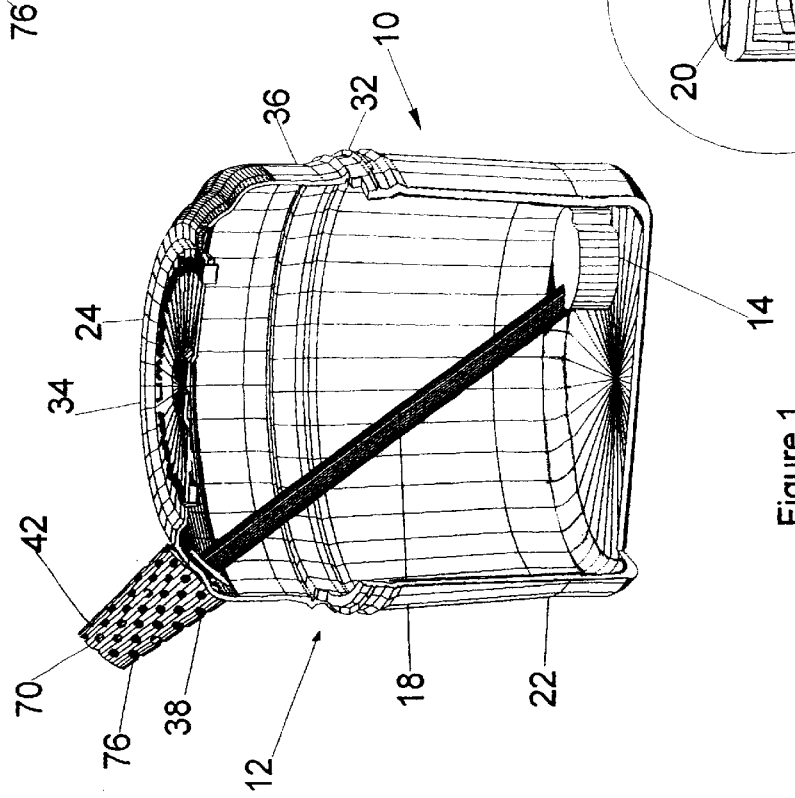
Figure 1

LIMITED FLOW CUP

CROOS-REFERENCE TO THE RELATED PATENT APPLICATION

The present application claims the benefits under 35 U.S.C. 119(e) of provisional patent application Ser. No. 60/098,144 filed Aug. 27, 1998. This application incorporates by reference, as though recited in full, the disclosure of co-pending provisional patent application Ser. No. 60/098,144.

BACKGROUND OF THE INVENTION

1. Field of the Invention

The invention discloses a cup that will dispense a predetermined amount of fluid to a user using a valve having no moving parts.

2. Brief Description of the Prior Art

When a person suffering from dysphagia attempts to swallow liquid in the normal amounts, the liquid often goes down the bronchus and into the lungs, causing coughing, choking and even aspiration pneumonia. This difficulty is exacerbated when the user tilts his head backward in the normal drinking position. Dysphagia is a condition associated with stroke, head injury, or other neurological disorders, and aging, and frequently occurs as a transient condition following some surgeries.

It is known that swallowing in people suffering from dysphagia may be enhanced if the head is not angulated rearwardly while drinking. In an attempt to take advantage of this, "nose-cups" have been designed which include a container part whose inner wall is circular in shape and a cutout on the rim to accommodate the nose of the user. This permits drinking while the user's head remains substantially vertical. However, such cuts have an unusual appearance, which some users may find undesirable and thus avoid using. Additionally, such conventional "nose-cups" have cylindrical inner walls that do not facilitate controlled fluid flow, tending to lead to fluid spillage. Another attempt to overcome the problem includes a cup with an exaggerated beaker-shaped pocket formed for the nose.

U.S. Pat. No. 5,323,928 to Stevens provides a drinking cup that includes a hollow container portion having a base and an upwardly extending side wall. The side wall defines an elliptical aperture at its apex. The inner surface of the sidewall defines an ellipse from a horizontal cross-sectional perspective at substantially all elevations between the aperture and a point proximate to the base of the container portion. The user's nasal bridge is accommodated within the aperture during drinking to prevent substantial backward angulation. Although the '928 patent provides a better gripping area and funnels the liquid to the center of the user's mouth, it does not control the amount of liquid dispensed to the user.

One solution posed by practicing speech pathologists is a drinking vessel which releases a measured amount of liquid, about 1 teaspoon, which is the amount that will be able to be swallowed by the person with dysphagia by virtue of filling and emptying of the diverticular pouches in larynx. Other solutions include spoon-feeding liquids one teaspoonful at a time or using gelling agents to thicken the liquid so it can be eaten like solid food.

In U.S. Pat. No. 5,222,940 Wilk discloses a device for facilitating the administration of medicine comprising a tube having a cup-shaped member at the distal end. The cup-shaped member contains markings to measure the medicine to be administered. Although this device serves for applications of small amounts of medicine, its overall design eliminates its use as a drinking cup as disclosed herein.

Prior art devices are complex and none mimic the action of simply lifting the drinking vessel to the lips. The disclosed drinking cup incorporating the limited flow valve has overcome the problems associated with the prior art.

SUMMARY OF THE INVENTION

The disclosed cup utilizes a measuring valve, having no moving parts, situated in a container that regulates the flow of liquid, delivering a predetermined quantity of liquid to the user by rotating the container. Once the valve is filled, the container is rotated to a position where fluid is no longer covering the inlet of the valve. Once the inlet is exposed to the air within the container, the fluid is free to move out of the valve and down the dispensing tube. Further rotation delivers the fluid, through gravity, with the process being repeated to dispense the desired quantity of liquid.

The container consists of a vessel having at least one side, an open end and a base and, in most embodiments, a watertight lid. If a lid is not used, a clip can be placed adjacent the open end to receive the dispensing tube. Within the container is a valve that has at least one side, a height, a dispensing tube inlet and a fluid inlet port. Preferably the valve is adjacent to the base in a position to receive liquid through the fluid inlet port and in some embodiments the valve can be integral with the base. The liquid is dispensed through use of a dispensing tube having a first end in contact with the dispensing tube outlet port and a second end exiting the vessel. To ensure proper dispensing, the exiting point of the dispensing tube must have a distance from the base greater than the height of the valve.

The valve is dimensioned to contain and dispense a predetermined amount of liquid. The liquid is in fluid contact with the inlet port when the base is in a first position and out of fluid contact with the inlet port when the base is in a second position. Thus, the valve fills with liquid when the container is in a substantially horizontal position while angling the container removes the liquid from contact with the valve, stopping further fluid from entering the valve inlet port. The fluid within the valve cannot be delivered until the container is in the second position, brining the inlet port into contact with the container air.

Preferably the container has a sealable, watertight lid at the open end that contains a dispensing tube receiving port dimensioned to receive the dispensing tube. When sealing the container with a lid, at least one vent hole, preferably within the lid, must be used to enable airflow into the container. In some embodiments, a retaining ridge can be placed within the interior of the container and dimensioned to receive a lid. The lid and the ridge should interact to prevent passage of fluid past the lid. The lid can also contain a refill inlet to enable liquid access without removal of the lid. The refill inlet can have a watertight lid to prevent liquid transfer from the vessel or a cover to enable air transfer into the vessel.

The valve can be a polygon with a top plate and can be offset from a center point, the base, adjacent to the container side. In some embodiments, when the valve is not placed adjacent to the base, the valve has an opposing base. In most embodiments, at least a portion of the valve tube inlet is cut within the top plate to enable maximum effectiveness. The fluid inlet port can be in the side of the valve, preferably with a height equal to the height of the valve, or placed in the top plate of the valve. When the fluid inlet port is on the side of the valve it is generally adjacent to the container side. The valve can be removably maintained within the container through the use of flanges that are integral to the base and dimensioned to receive the valve in a friction fit. When a side inlet is used, the flanges must be dimensioned so that they do not impede fluid communication between the inlet port and the vessel.

In another embodiment the valve is a tube having a fluid inlet at a first end and a tube inlet at a second end. The first end of the dispensing tube and the valve tube inlet are in fluid communication and can, optionally, be an integral unit. This embodiment can also contain retaining clips affixed to the base and/or sides to affix the valve and dispensing tube to the container.

The container can have a raised base containing a valve receiving area dimensioned to receive the valve. The height of the raised base adjacent to the sides is greater than the base height adjacent to the valve, sloping downward to the valve height at the valve receiving area.

In embodiments where there is a tube vent incorporated within the dispensing tube, it is preferable to include a drinking shield with at least a portion of the interior dimensioned to receive the dispensing tube and tube vent and an exterior configured to facilitate drinking. The drinking shield can be permanently or removably affixed to the lid or, as an option, manufactured as an integral part of the lid. To facilitate removal the lid can have flanges dimensioned to receive the drinking shield, enabling the shield to snap on and off. The shield, especially when an integral part of the lid, can have a base containing air holes to enable air flow into the vessel.

In one design the container contains a vent chamber within the container adjacent the lid, enabling the dispensing tube air hole to be located within the container. The vent chamber is in air communication with ambient air and can be positioned to vent the dispensing tube air hole, thereby preventing inadvertent blockage of the hole The liquid measuring valve enables fluid to enter the valve and the dispensing tube when the container is at a first position and prevents liquid from entering the tube when the container is in a second position. The valve and dispensing tube are dimensioned to contain, and dispense, a predetermined amount of liquid. The amount of liquid reduces, proportionally, to the reduction of liquid volume within the container. In order for the valve to dispense a regulated amount, the liquid must be at or below a predetermined fill level. The predetermined fill level is determined by the volume of liquid remaining in the container upon exposure of the inlet to container air when in said second position.

BRIEF DESCRIPTION OF THE DRAWINGS

The advantages of the instant disclosure will become more apparent when read with the specification and the drawings, wherein:

FIG. 1 is a cutaway side view of the limited flow cup of the instant disclosure;

FIG. 2 is a perspective view of the valve of FIG. 1;

FIG. 3 is an exploded cutaway side view of the limited flow cup of FIG. 1;

DETAILED DESCRIPTION OF THE INVENTION

Figure 5:
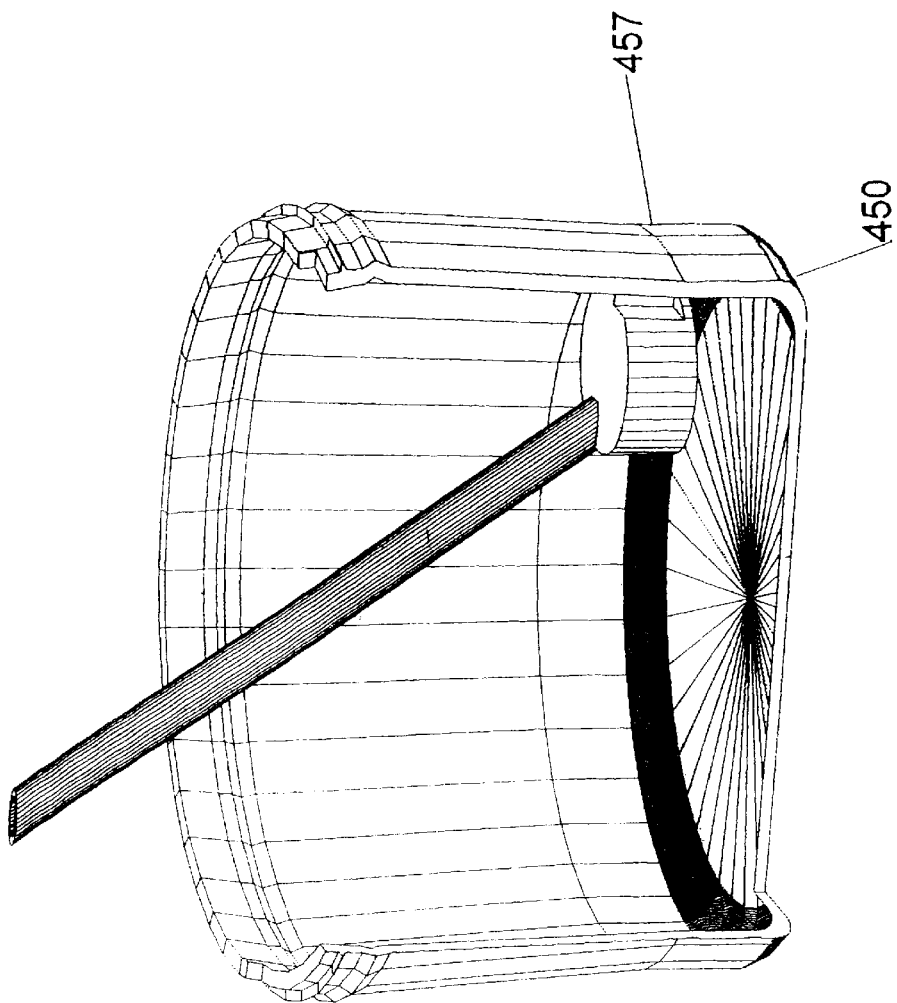
FIG. 5 is a cutaway side view of a limited flow cup using the valve of FIG. 4.

The disclosed limited flow cup overcomes the difficulties of efficiently and safely administrating thin liquids, such as water, milk, etc., to people suffering from swallowing dysphagia. Although dysphagia, or difficulty in swallowing, can have a number of causes, they all result in the potential to choke or have fluid pass directly into the lungs. In addition to its use by people suffering from dysphagia, the limited flow cup can also be used to administer medication; by bikers or runners for drinking water; or by children as a special cup.

The disclosed cup, without the use of moving parts, automatically dispenses liquids in a predetermined quantity. Unless noted otherwise, all reference to sizing, ratios, etc. will be directed to the use of the cup with people suffering from dysphagia. Dysphagia provides the greatest number of criteria to meet and any device meeting these criteria can be used for other applications. In some applications the cup may be filled at the place of manufacture and shipped pre-filled with medication, juice, or other fluid. Pre-filling is advantageous when the cup is being used for dispensing medications, such as liquid antibiotics. The valves on the pre-filled cups would be calculated to dispense the prescribed amount of medication, thereby increasing the ease of administering the medication to the patient. Pre-filling also is helpful in circumstances in which it is desirable to restrict the patient's ability to open the cup and defeat its controlled dosage mechanism. In most embodiments, the container is manufactured from a rigid material to prevent the cup from being squeezed to dispense additional fluid.

The limited flow cup 10, illustrated in FIGS. 1, 2, and 3 is comprised of a container 12, measuring valve 14, valve inlet 16 and dispensing tube, or straw, 18. The container 12 consists of a top 24 and vessel 22 that are retained together in a manner to prevent leakage or accidental separation. One method of retaining the top 24 and vessel 22 is through use of a snap seal as illustrated in FIGS. 1 and 3. In this Tupperwear® type of seal, a receiving rim 36 is provided that interacts with a locking ridge 32 on the vessel 22. Other methods, such as screw tops or simple snap seals, can also be used and will be evident to those skilled in the art. The measuring valve 14 is a chamber having a top and closed side(s). As explained in more detail hereinafter, the interior volume of the measuring valve 14 is less than the predetermined amount of liquid to be dispensed. The liquid enters the measuring valve 14 through an inlet port 16 and exits the measuring valve 14 through a dispensing tube outlet port 20. To ensure that an air pocket will not form within the valve 14, the inlet port 16 has a height equal to the height of the valve 14. Preferably, as illustrated in FIG. 2, the inlet port 16 is cut a short distance into the top of the measuring valve 14 to permit easy filling without the creation of air pockets. A dispensing tube, or straw, 18 is secured to the dispensing tube outlet port 20 at one end and exits the top 24 to permit the user to pour the liquid out of the vessel 22. In the illustrated embodiment, air vents 34 have been provided in the top 24 of the vessel 22 to permit air to enter the closed container 12, thereby preventing a vacuum from forming. Depending upon the application, air vents will not always be required and the need to incorporate the vents will be obvious to those skilled in the art.

Optimum functionality is dependent upon the dimensioning between the elements disclosed herein which include:

the height of the valve body;

the diameter of the vessel;

the angle and diameter of the tube;

the position of the valve relative to the floor of the vessel; and the orientation of the valve to the fluid.

The disclosed cup is intended to repeatedly dispense a predetermined amount of fluid. The predetermined amount of fluid is initially measured by filling the valve and tube, through the inlet port, when the container is in a first position on a horizontal plane. The valve inlet breaks the fluid horizon in a second position, stopping in flow to the valve and at the third position the predetermined amount of fluid is, due to gravity, completely dispensed. For ease of explanation, reference will be made to a triangle formed within the container by the dispensing tube, wall and base. Although this is, in most embodiments, not a literal triangle but a figurative triangle, the triangle reference provides references points to facilitate description. The angles of the triangle are the junctures of the base/dispensing tube, the dispensing tube/side wall and the side wall/base. In the first position the tube outlet, at the dispensing tube/side wall juncture, is at the apex of the triangle. The valve inlet breaks the surface of the liquid in a second, intermediate position that places the base/dispensing tube juncture about midway between the base and the apex of the triangle. The measured dose of fluid is completely dispensed when the container is rotated to a third, non-horizontal position, placing the base/dispensing tube juncture at the apex of the triangle. The placement of the inlet port above the plane of the outlet during dispensing ensures that additional liquid does not enter the valve during side-to-side movement. It should be noted that the ratio of vessel size, valve size and predetermined fill level prevents fluid from being dispensed from the dispensing tube prior to the valve inlet breaking the liquid's surface. The amount of liquid dispensed after each use decreases after each dispensing. Since the fluid level within the cup is lower, the quantity retained within the tube is lower, reducing the dispensed amount. The quantity reduction presents no health or use problems when the device is used as a drinking container and would only be addressed when used to dispense medication, and can be re-dimensioned according to the type of medication, etc. The minimization of the quantity reduction is does, however, increase the criticality of the dimensioning of the dispensing tube and the valve. To avoid a dramatic drop in the quantity dispensed in each use, the valve must contain the greater portion of the total dispensing volume of liquid. In the preferred embodiment, the volume of the dispensing tube is less than about 25% of the combined volume of the dispensing tube and measuring valve. If the diameter of the straw is sufficient to retain a major portion of the total volume, the volume decrease between applications would be more dramatic.

Figure 11:
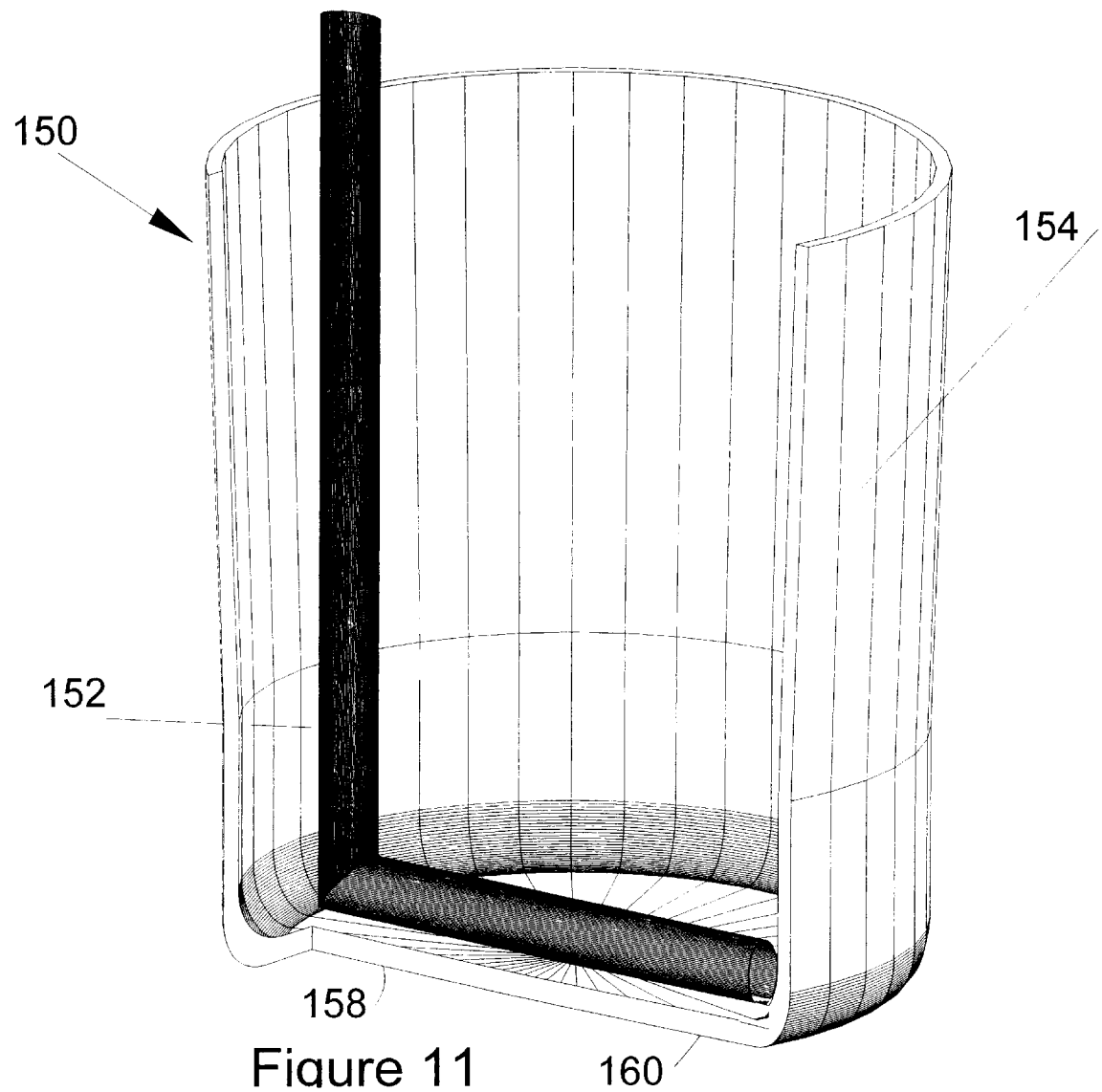
FIG. 11 is a cutaway side view of an alternate embodiment using an L-shaped tube/valve combination.
Figure 18:
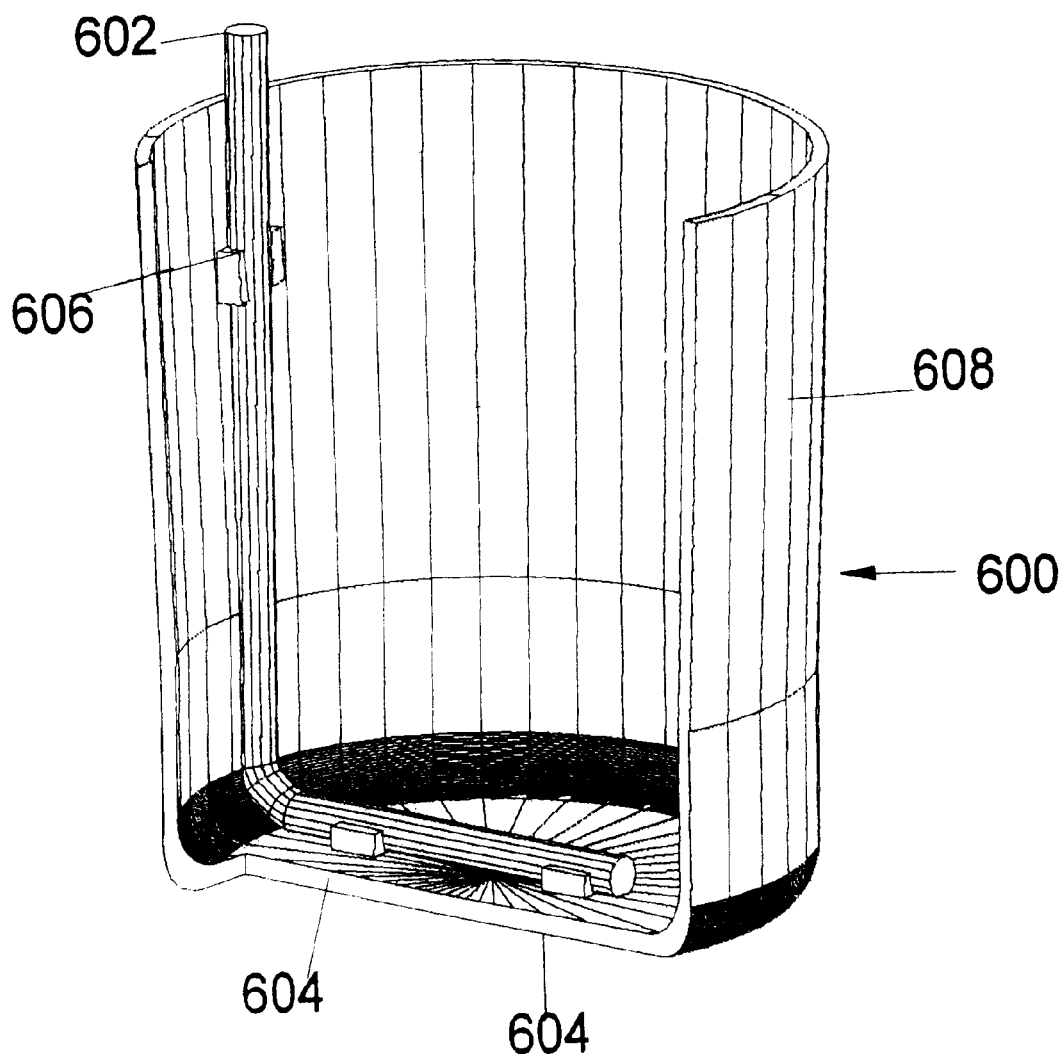
FIG. 18 is cutaway side view of an alternate design to FIG. 11 using clips to retain the dispensing tube

In some applications the foot valve, such as disclosed in FIG. 2, provides benefits over the tube valve disclosed in FIGS. 11 and 18. In the foot valve embodiment, the design is such that additional liquid is prevented from entering the valve during the side-to-side movement of the cup that can occur during use. This occurs because the foot valve fills with water and does not empty until a point in the device's operational rotation where the valve inlet is above the level of the liquid remaining within the container. At that point, if the container is rotated from side to side, the valve inlet does not come to a position where liquid can again enter. The tube valve will also measure and dispense a predetermined amount of liquid, however it does not prevent additional liquid from entering the valve during any side-to-side movement. Although the amount of additional liquid that would enter at one time is not substantial, the additional liquid can cause medical problems in some instances. It will be evident to those skilled in the medical arts when the additional safety precautions provided by the foot valve should be implemented.

To prevent the liquid from continuing to enter the measuring valve, the liquid level must not cover the valve inlet from the point where the container commences dispensing the fluid to the completion of dispensing process. To achieve an optimum predetermined dispensing, or fill, level, which provides safe dispensability while holding the maximum amount of liquid, the base and sides of the container must comprise sufficient volume to accommodate the liquid, maintaining it clear of the inlet, while drinking. To maintain the diameter of the container as small as possible while holding the maximum "safe" quantity of liquid, the top is preferably domed as this enables a portion of the liquid to be retained in the top as well as the body of the cup during the drinking process. Because the valve must be uncovered during the tilting and drinking process, the amount of liquid able to be placed within the container must be restricted. Two of the factors determining the predetermined fill level are the diameter and height of the container, and can be calculated on an individual basis. The amount of fluid a vessel can contain is must also take into consideration the diameter of the vessel to the height of the valve inlet. Although the relationship will vary depending upon end use, the preferred relationship is approximately 80–90% of the diameter of the container equals the maximum height of fluid in the container at which point the multiple dispensing effects begin. When using the device on a day-by-day basis, the predetermined dispensing level can be determined by filling the cup to about 90% of capacity and pouring out the liquid until the valve inlet reaches the second position of being above the water horizon. Any of the embodiments disclosed herein can also be provided with a maximum fill line.

When determining the ratios between the container diameter and the valve and angle of the dispensing tube, the dispensing angle of the container must also be taken into consideration. To comfortably dispense the liquid, the user should not be required to rotate their head beyond a normal drinking angle. Thus, a straw and valve arrangement as illustrated in prior art sugar containers as disclosed in U.S. Pat. No. 2,148,421 to H. E. Allan would require too much head rotation to enable comfortable use. This arrangement, wherein the straw and "valve" are parallel with the container wall and in a direct line with the dispensing inlet further requires 180 degrees of rotation prior to the contents moving beyond the base inlet. In addition to the discomfort cause by the need for extensive head rotation, the amount of liquid dispensed would be dependent upon the rapidity of rotation rather than any internal measuring device. Further, since there is no method of measuring then dispensing in the Allen device, there is no method of measuring a predetermined amount and then safely dispensing that amount. Since this, and similar devices, are designed to dispense granular material, the methods for measuring and dispensing taught in Allen would not be feasible for liquids. In the Allen device, the liquid would continue to flow through the straw until sufficient liquid has been dispensed to expose the dispensing inlet.

As stated heretofore, the amount dispensed equals the volume of the valve body, plus the volume of fluid in the dispensing tube. Due to the pressure created by the level of the fluid within the container, the tube will fill to the current level of the liquid within the container. Thus, the total volume dispensed will decrease with each dispensing, eventually falling below the volume of the valve chamber. It is therefore critical when calculating the volume to be dispensed that the maximum amount of liquid being retained in the tube be added to the measuring valve chamber volume. Thus, if a person can only swallow one (1) teaspoon of liquid, the volume of the chamber plus the maximum contained within the tube through pressure equalization should be one (1) teaspoon.

In the embodiment of the limited flow cup 10, illustrated in FIGS. 1 and 3, the dispensing tube 18 exits the closed container 12 at approximately a 45° angle from the base vessel 22 of the container 10. As described in more detail hereinafter, the tube can be at a variety of angles, with the optimum angle being dependent upon the end use. When the dispensing tube exits the container along the sidewall, the point of exit must be a greater distance from the base than the height of the valve inlet to maintain the liquid within the container in a first, non-tilted position. The 45° angle, achieved by placing the valve 14 opposite the tube outlet 38, enables the user to drink from the container without tilting his head back. The angle between the tube and the base can be reduced dramatically; however the tube outlet must have an outlet to base distance greater than the height of the valve.

Figure 4:
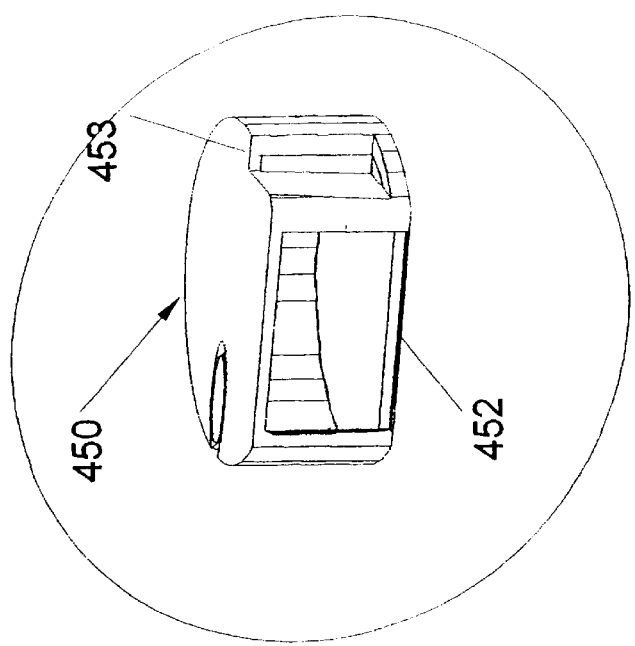
FIG. 4 is an alternate measuring valve having a floor.

In the illustrated embodiment, the valve 14 is free to move within the vessel 22. In order to maintain the desired angle between the valve 14 and the outlet 38 while enabling the valve 14 to remain in contact with the bottom of the vessel 22, the connections between the various parts must not be easily dislodged. To accomplish this, the tube 18 and valve 14 are manufactured of a rigid inert material that can be safely affixed to each other. The valve 14 can be formed without a bottom so that the base of the vessel 22 forms a seal with the valve 14. The valve outlet port 20 is cut at an angle that ensures that the tube 18 can only be inserted at the desired angle. The tube 113 is then secured to the valve 14 by any means applicable to the materials of manufacture. The outlet 38 in the top 24 is preferably a friction fit to maintain the valve 14 in contact with the bottom of the vessel 22. One advantage of maintaining the valve 14 as removable is the ability to easily clean the unit. Alternatively, as illustrated in FIGS. 4 and 5, the valve 450 can be provided with a bottom plate 452 so that firm contact with the bottom of vessel 457 is not required for the cup to function. The inlet port 453, as illustrated, is cut along the side and top of the valve 450, as described heretofore. The inlet port in this embodiment can also be located within the top of the valve.

To prevent the disclosed device from being used as a standard cup and straw, a tube vent 40 is preferably cut into the tube 18. Although the tube vent 40 can be of variable size, it is preferable that the vent 40 be equal to or greater than the area of the cross section of the tube 18. To prevent any liquid from entering the tube vent 40, the vent 40 is cut from the tube 18 at a point above the top 24. The vent 40 must be cut from the portion of the tube 18 opposite the user to prevent the liquid from pouring out while drinking. If the user sucks on the tube 18 while the cup 10 is in an upright or slightly rotated position, no fluid will be removed from the vessel 22 as the vent 40 will simply draw air into the tube 18. Since the area of the vent 40 is preferably larger than the area of the cross section of the tube 18, air will be easily drawn in rather than the fluid contained in the vessel.

Figure 17:
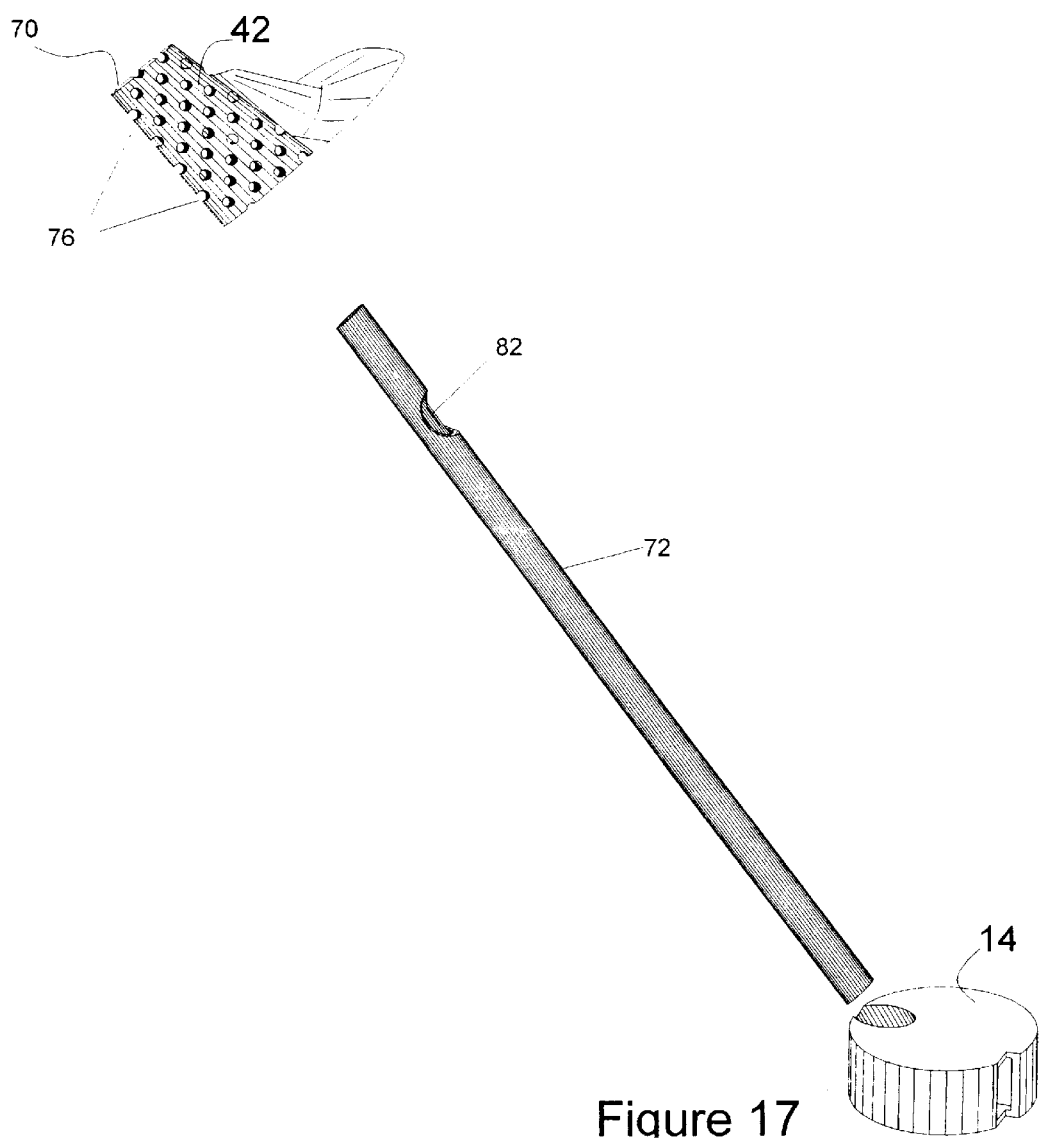
FIG. 17 is an exploded side view of a mouthpiece, tube and valve for use with the cup embodiments disclosed herein.

In order to prevent a user from putting his finger over the tube vent 40, either intentionally or inadvertently, a shield 42 is placed over the tube 18. The shield 42 as illustrated, is configured similar to a child's sipper cup mouthpiece; however this is for design only and is not intended to limit the scope of the invention. The purpose of the shield 42 is primarily to prevent the tube vent 40 from being blocked, however the shield can be modified to retain and permit liquid flow back into the cup. The shield 42 is provided with air vents 76 and is maintained on the tube 18 through a friction fit. The tube 18 should have a length sufficient to enable the open end 78 of the tube 18 to be at, or slightly beyond, the shield edge 70 while the base of the shield is in contact with the top 24. The assembly of the valve 14, tube 18 and shield 42 is illustrated in FIG. 17 incorporating an optional wrap around shield 80. The wrap around shield 80 prevents the user from covering the drinking shield with the mouth and defeating the pressure equalization provided by the air vents. Alternatively, the lid of the container can be designed in such a way as to prevent a user from placing his/her mouth completely over the tube vent 40. This can be accomplished by forming a radial groove around the lid or an indentation positioned to receive the dispensing tube in a manner to maintain the tube vent recessed below the lid surface. Other methods of preventing contact with the tube vent will be apparent to those skilled in the art.

The cup 10, as illustrated in FIGS. 1 and 3, is easily used as a fill and ship unit that is filled by the manufacturer and shipped to an end user. This is especially beneficial for hospitals and nursing homes where the level to which the cup can be filled is critical and attendant time is limited. The sealed units are also advantageous for dispensing predetermined doses of medicine. When manufactured as a disposable unit, the plastic can be lighter weight than in the reusable units. Additionally, the valve within the disposable units can be affixed to the units through either an inert adhesive or manufactured as an integral part of the unit. The diameter of the tube in the disposable units is also not as critical as future cleaning is not an issue.

Figure 7:
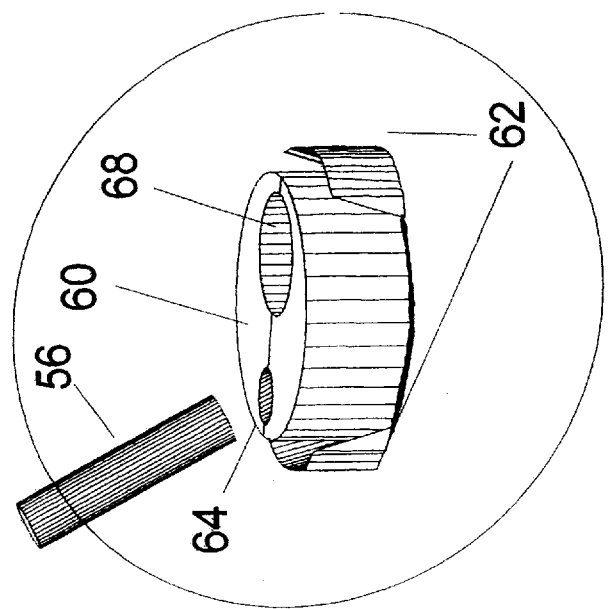
FIG. 7 is a perspective view of the valve and flanges of FIG. 6.
Figure 6:
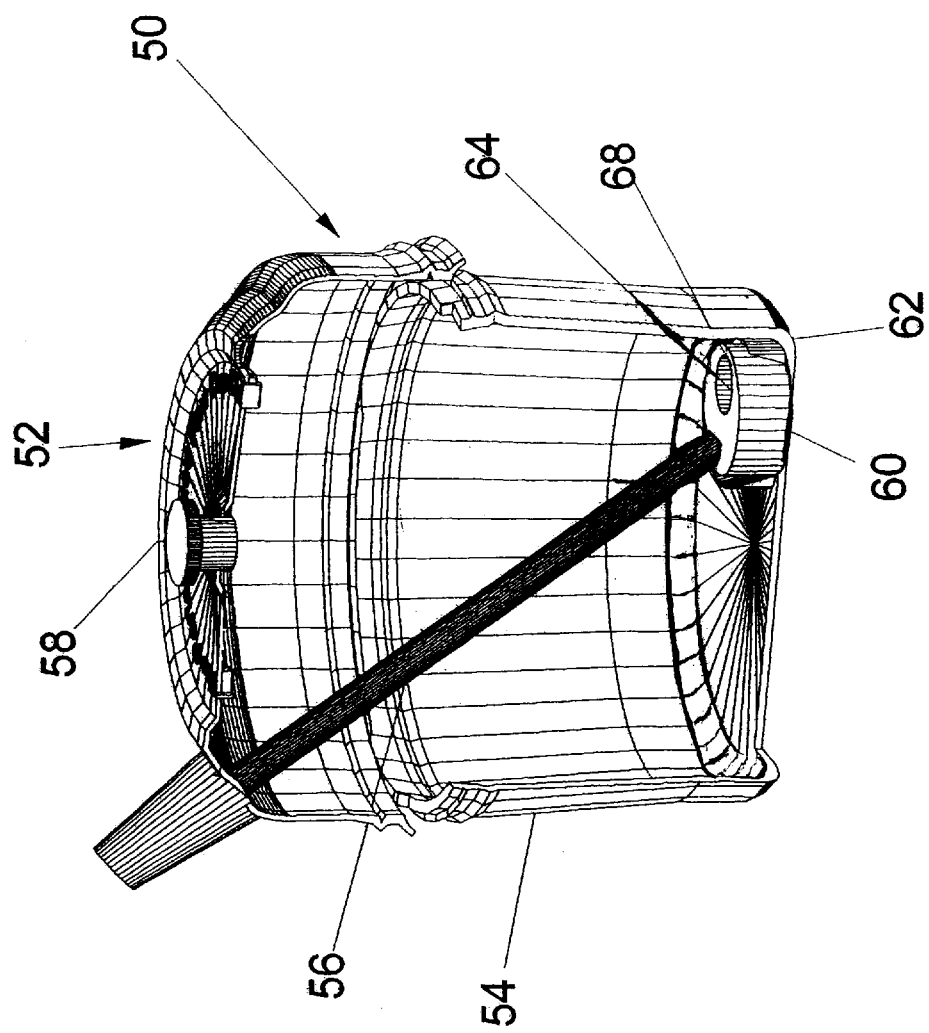
FIG. 6 is a cutaway perspective view of an alternate embodiment incorporating flanges to maintain the valve in position.

FIGS. 6 and 7 illustrate an alternate embodiment of the limited flow cup 10. The vessel 54 of the limited flow cup 50 is manufactured with a valve-retaining flange 62 that is dimensioned to receive the valve 60 in a friction fit. By using the retaining flange 62 to prevent the valve 60 from moving within the vessel 54, the tube 56 can be of lighter weight and, if desired, replaceable. Since a major concern is cleaning, the retaining flange 62 permits the measuring valve 60 to be snapped in and out. The retaining flange 62 can be manufactured as a single unit or multiple pieces, depending upon manufacturing preference. As with the valve 14, the angle of the outlet 64 is such to allow the tube 56 to only be inserted at the predetermined angle. In this embodiment, the valve inlet 68 has been moved to the top of the measuring valve 60, adjacent the tube outlet 64. In embodiments where the inlet 68 is on the top of the measuring valve 60, no fluid will be dispensed once the level of the fluid drops below the height of the valve. This provides the assurance that the minimum quantity dispensed is equal to the volume of the valve.

The top 52 is provided with fill port 58 that permits refilling of the vessel 54 without necessitating removal of the top 52. The fill port 58 can also contain the air hole(s) to prevent a vacuum from being formed within the cup 50. In this embodiment the tube 56 does not incorporate the air hole as illustrated in FIGS. 1 and 3. Difficulty in swallowing has various causes and the precautions required for someone with impaired executive functions are far more stringent than for a person with dysphagia caused by surgery. Since not all people with swallowing difficulties require the same careful monitoring, the limited flow cup 50 does not include the "fail safe" features incorporated within the limited flow cup 10. It should be noted, however, that any of the features disclosed herein can be incorporated in any of the embodiments disclosed herein.

Figures 15, 16:
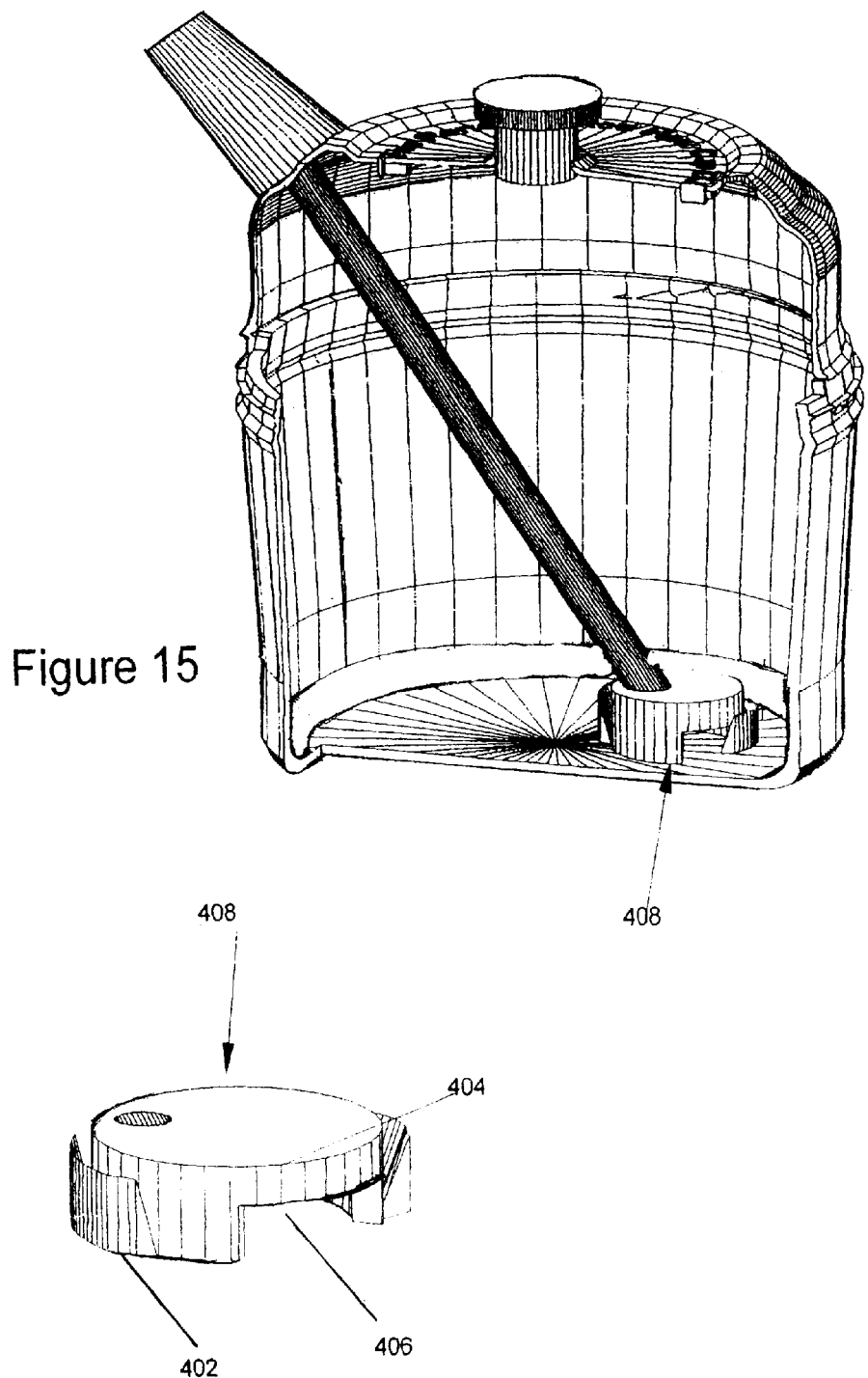
FIG. 15 is a cutaway side view of a limited flow cup using an alternate valve design.
FIG. 16 is a perspective view of the valve design of FIG. 15.

An alternate to this valve design is illustrated in FIGS. 15 and 16 wherein the valve 408 has a base inlet 406. The pair of retaining flanges 402 are positioned to form an inlet 404 that has a size approximately equal to, or greater, that the size of the base inlet 406. Alternatively, one flange can be used, with an opening being left in the flange adjacent base inlet 406. This enables the liquid to enter the valve 408 through the flange inlet 404 and base inlet 406. When the valve 408 is replaced after cleaning, the base inlet 406 and the flange inlet 404 must be aligned to permit maximum flow. As the valves in all embodiments require alignment to enable the tube to be properly inserted, any additional alignment between the inlets 406 and 404 will be minimal.

Figure 8:
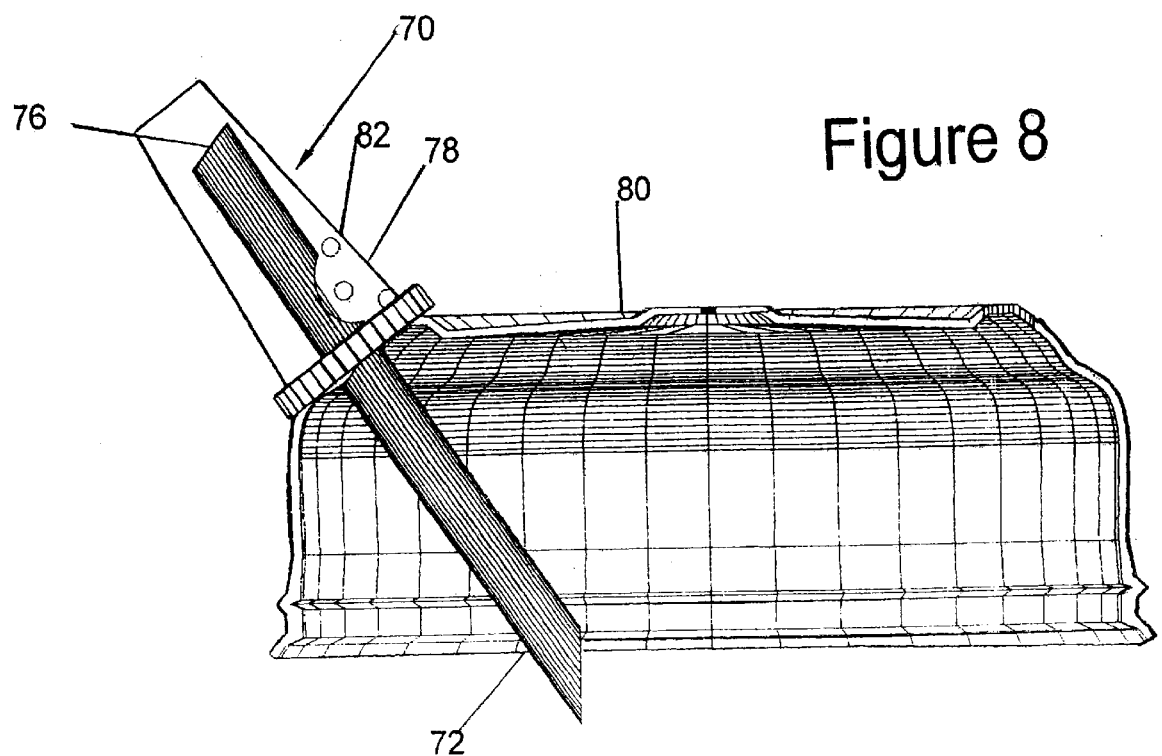
FIG. 8 is a side view of a shield manufactured as part of the top.
Figure 9:
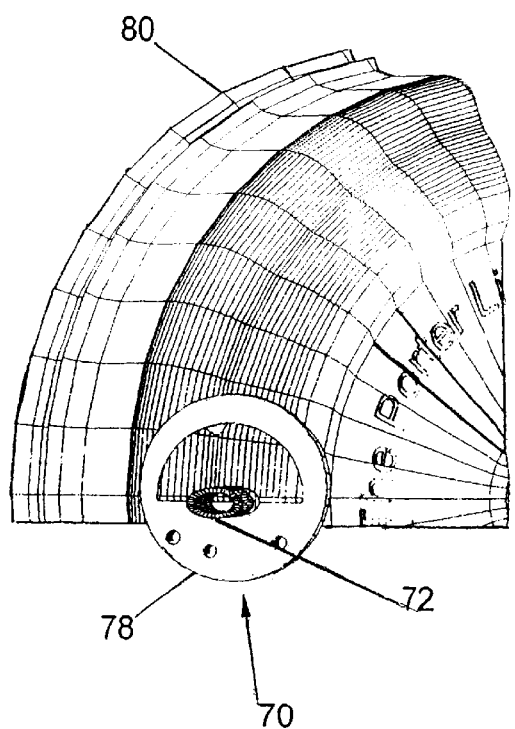
FIG. 9 is a top view of the shield of FIG. 8.

FIGS. 8 and 9 illustrate a shield 70 that is molded as part of the cup lid 80. The tube 72 of the shield 70 extends from the liquid outlet 76 into the cup (not shown). To allow for sufficient airflow and prevent the user from blocking the air hole 82, vents 78 are dispersed around the shield 70. This is an example of one shield design and any number of designs can be incorporated. The critical features of any design are the incorporation of the vents and air hole while preventing blocking by the user's fingers.

The air hole, when combined with the vessel/valve and an exhaust tube will prevent sucking fluid in any position. If the vessel is level or tipped to the delivery of fluid from its terminus, sucking will draw in air and any fluid contained in the tube above the hole. The air hole can be incorporated into any of the embodiments disclosed here.

Figure 10:
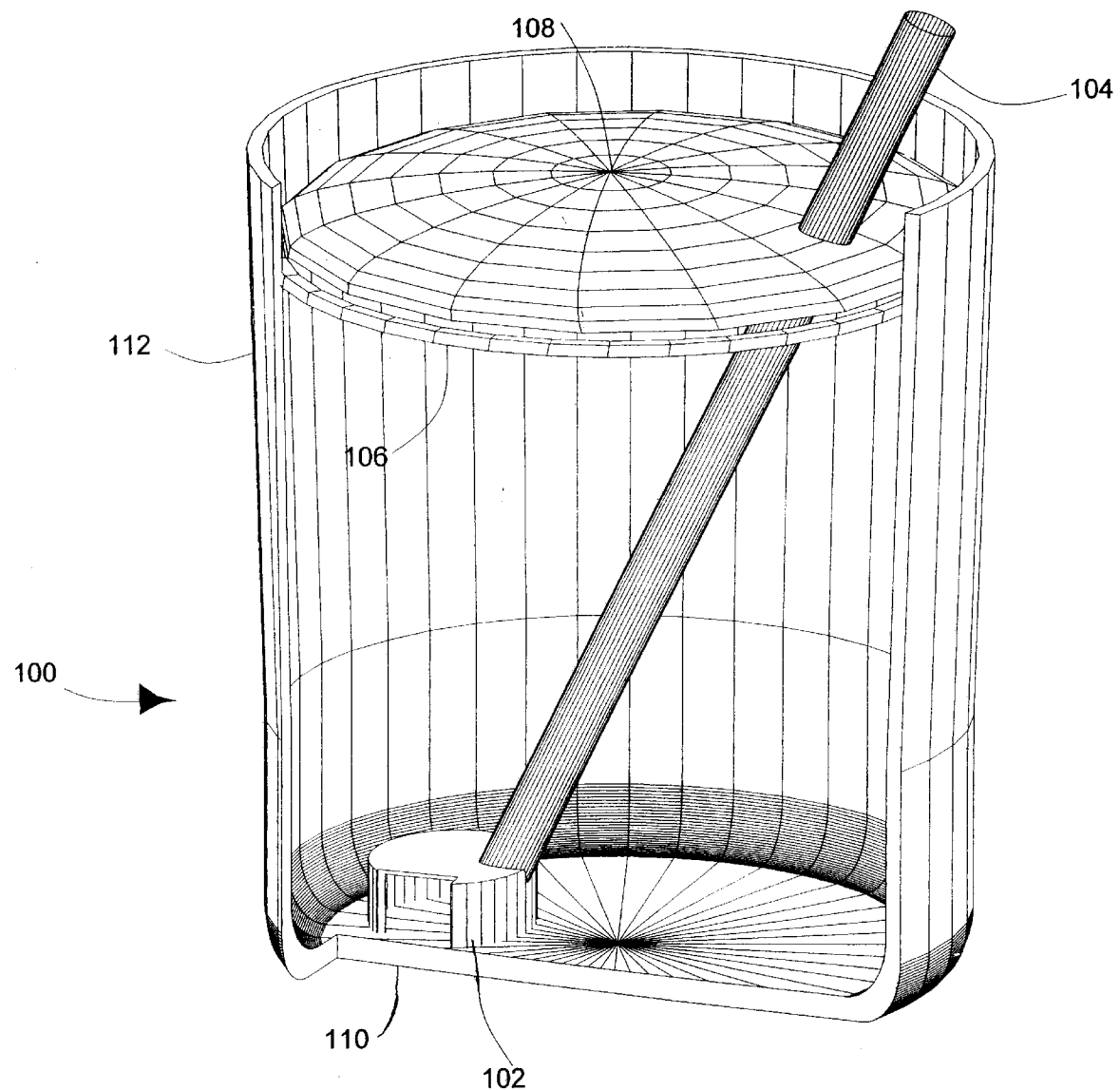
FIG. 10 is a cutaway side view of an alternate embodiment of the invention for use as a replacement for a standard glass.

FIG. 10 provides a substitute for a standard glass by incorporating the limited flow valve 102 in a glass, or Plexiglas®, drinking glass 100. The valve 102 is provided with the inlet 110 and is securely affixed to a tube 104. The glass 100 is provided with a fastening rim 106 around its interior periphery. A domed top 108 snaps onto the rim 106 to prevent the liquid from spilling out of the glass 100. The tube 104 can be either permanently or removably secured to the top 108, depending upon preference. Further, the tube 104 can end simply as a tube or can be provided with a shield as disclosed above. This embodiment permits the user to most closely emulate using a regular cup or glass. When manufactured from a clear material, the glass 100 can be used in public without drawing attention to the user. Additionally, the outer body 112 can be manufactured from a ceramic, a handle added, and the device can be used as a coffee mug.

In FIG. 11 the drinking glass 150 uses the tube 152 as both the drinking apparatus and the valve. In the illustrated embodiment the tube 152 is illustrated as L-shaped, however other configurations can be used and will be evident. The tube 152, for ease of description herein, is divided into the dispensing tube 156 and the valve 158, although the tube 152 is a single unit. The valve 158 and dispensing tube 156 fill to the level of the liquid within the glass 154. Once tipped, the open end 160 of the valve 158 no longer receives liquid, thereby preventing more liquid than is contained within the tube 152 from being dispensed. The maximum amount of liquid to be dispensed is controlled by the diameter of the tube 152, length of the valve 158 and the predetermined fill level. The predetermined fill level can be determined as noted heretofore. The cup 150 is not illustrated with a top; however any of the tops and sealing mechanisms previously disclosed can be incorporated herein.

An alternative to the cup of FIG. 11 is illustrated in FIG. 18 wherein the dispensing cup 600 contains a tube/valve combination 602 that is retained within the vessel 608 through use of wall clip 606 and base clips 604. Although one wall clip and two base clips are illustrated, this number can be varied in accordance with the configuration of the vessel. The tube/valve combination 602 illustrated is flexible plastic tube that is dimensioned to dispense a predetermined amount of liquid. In some instances, a disposable flexible straw can be used, dependent on the dimensioning of the cup and amount of liquid to be dispensed.

Figure 12:
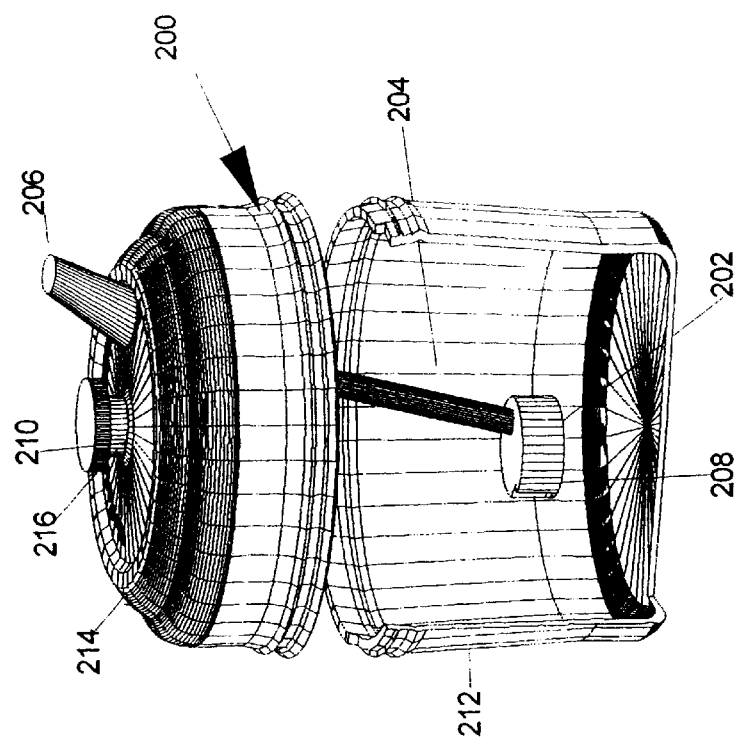
FIG. 12 is an exploded cutaway side view of an alternate embodiment of a limited flow cup.

In FIG. 12 an alternate limited flow cup 200 is illustrated incorporating several of the options and alternatives available. The valve 202 is placed approximately in the center of the vessel 212, placing the tube 204 at an angle with the valve closer to 90°. The valve 202 in this embodiment has a top and bottom panel and is positioned within the vessel rather than next to the base. The inlet 208 of the valve 202 has been moved to the opposite side of the valve 202 than disclosed heretofore. Although this valve arrangement does work, it requires angulating the cup to almost an up side down position. The top 214 is provided with a filler inlet 216 with a snap or other closure top 210. The filler inlet 216 permits the vessel 212 to be repeatedly filled without having to dislodge the tube 204 or valve 202. The shield 206 of this embodiment is simply placed over the tube 204, using a friction fit to maintain the shield 206 in place. The shield 206 will be unable, due to general construction, to come in sufficient contact with the top 214 to prevent airflow between the shield 206 and the tube 204. Air holes can also be provided under the shield if desired.

Figure 13:
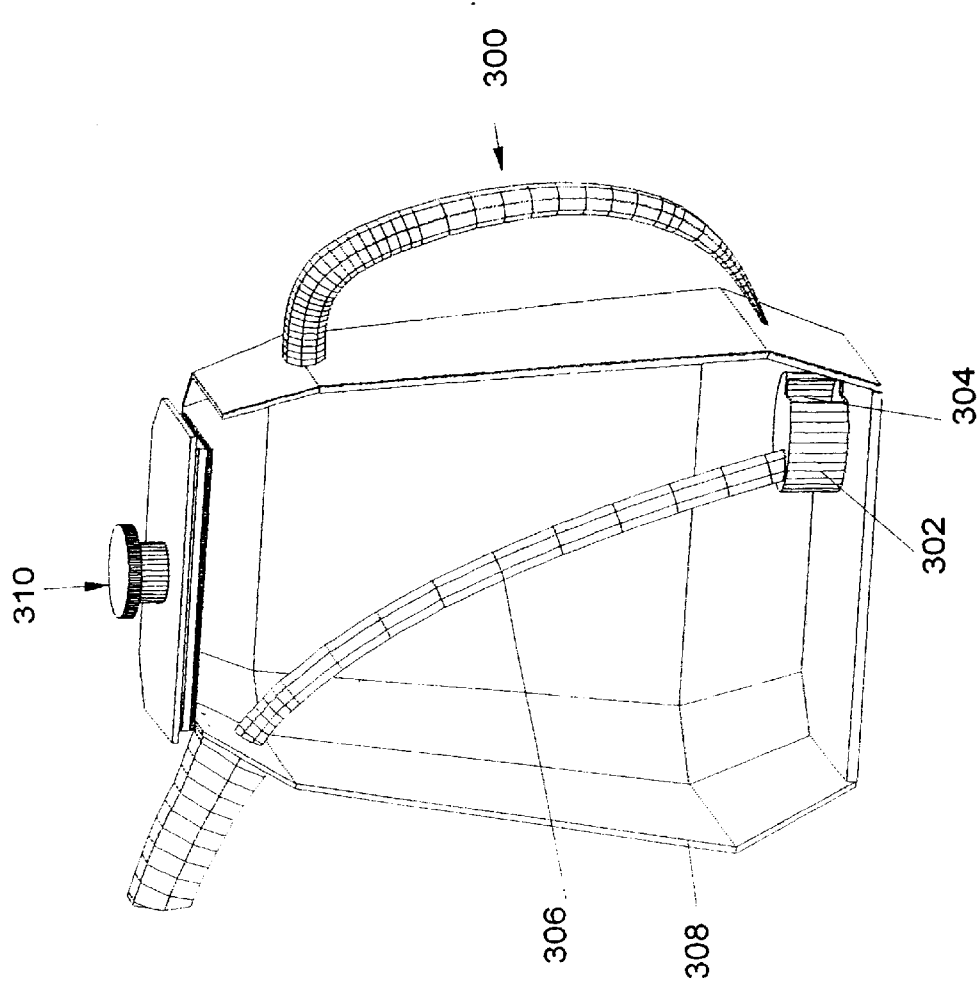
FIG. 13 is a cutaway side view of a liquid dispenser incorporating the limited flow valve.

FIG. 13 illustrates a measured flow-dispensing device 300 that contains a valve 302 with an inlet 304. The dispensing hose 306 extends from the valve 302 out the side of the vessel 308. The top 310 is removable to allow for the addition of water, etc., as well as for mixing. One of the uses for the flow-dispensing device 300 would be fertilizing plants where a pre-measured amount of fertilizer is applied to the plant. The bend of the dispensing hose is not critical, as the container can be tipped to any dispensing level needed to deliver the contents through gravity flow.

Figure 14:
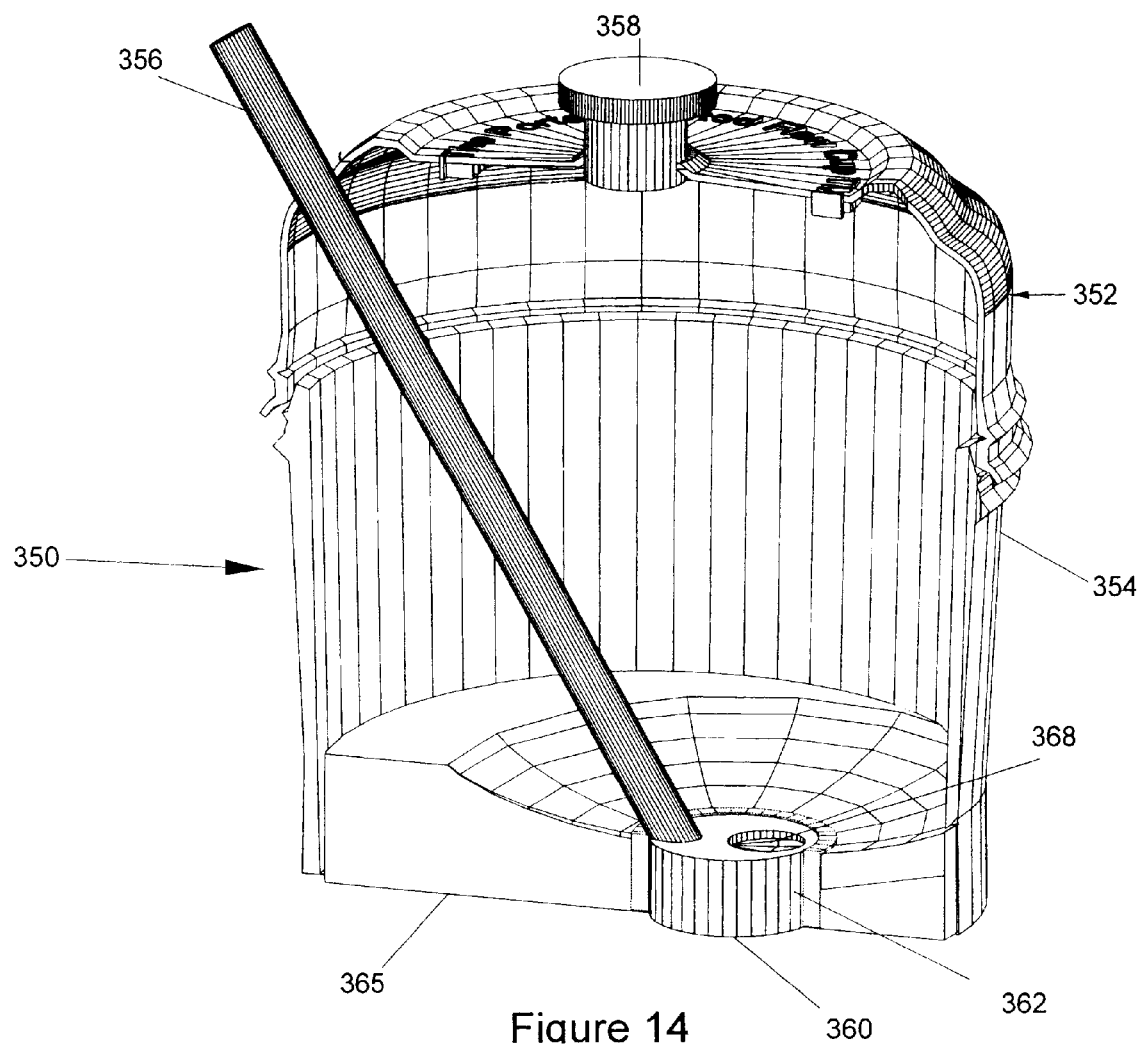
FIG. 14 is a cutaway side view of an additional embodiment of a limited flow cup having a recessed measuring valve and sloping floor.

FIG. 14 illustrates an alternate embodiment of the limited flow cup 350 wherein the measuring valve 360 is recessed within the base 365 of the vessel 354. This instantiation guarantees that all of the fluid in the cup 350 will be dispensed efficiently. The base 365 of the vessel 354 is sloped at an angle to facilitate the collection of fluid in the measuring valve 360. The vessel 354 is manufactured with a recessed valve-retaining flange 362 that is dimensioned to receive the valve 360 in a friction fit. As with the valve 14 of FIG. 1, the angle of the outlet is such to allow the tube 356 to only be inserted at the predetermined angle. In this embodiment, the valve inlet 368 has been moved to the top of the measuring valve 360, adjacent the tube outlet. In embodiments where the inlet 368 is on the top of the measuring valve 360, no fluid will be dispensed once the level of the fluid drops below the height of the valve. The angle on the base 365 of the vessel 354 is sloped so that all fluid flows into the measuring valve 360, ensuring that all of the liquid is dispensed.

The top 352 is provided with a fill port 358 that permits the refilling of the vessel 354 without necessitating removal of the top 352. The fill port 358 additionally serves as an air hole to prevent a vacuum from being formed within the cup 350. In this embodiment the tube 356 does not incorporate the air hole of as illustrated in FIG. 1, although the air hole can be readily included in this embodiment.

Figure 19:
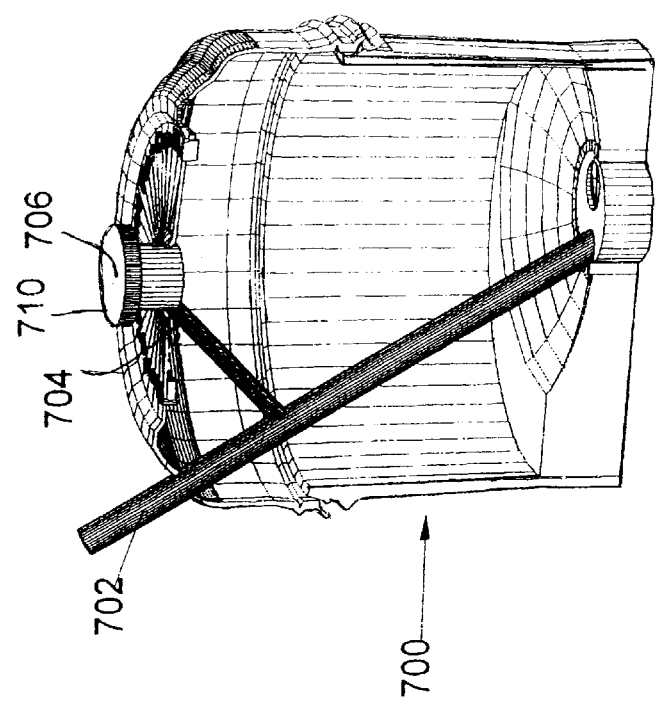
FIG. 19 is a cutaway side view of an alternate design incorporating a venting chamber within the top.

In the limited flow cup 700 of FIG. 19, the dispensing tube hole is placed within the container 700. To prevent a user from removing the fluid from the container 700 through suction, the dispensing tube 702 is vented directly by a venting tube 704 that leads from the dispensing tube 702 to the vent chamber 710. Air holes 706 within the vent chamber 710 enable ambient air to enter the dispensing tube 702 and prevent the vacuum. The air holes 706 enable airflow into the venting chamber 710, thereby preventing a user from sucking up liquid from the cup. In this embodiment, the shield can be eliminated, as there is no need to protect the tube vent hole 704 from being blocked by a user.

Figure 20:
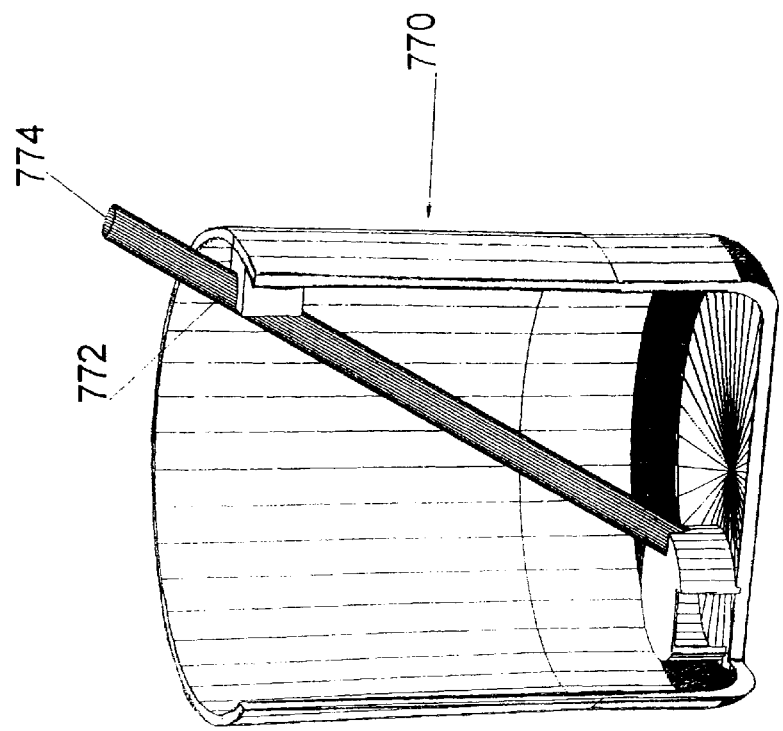
FIG. 20 is a cutaway side view of an open valved cup having a dispensing tube retaining clip.

In FIG. 20 the valved cup 770 is provided with a clip 772, or other securing device, that maintains the dispensing tube 774 in position. This embodiment eliminates the need for a lid to maintain the dispensing tube 774 is position. Although this embodiment has limited use, as a lid is required in many applications to prevent spillage, the valved cup 770 can be used when small amounts of liquid are dispensed. The use of clips 772 enables the dispensing tubes 774 to be easily inserted and removed with only the valved cup 770 requiring cleaning.

The foregoing are examples of the uses and configurations for containers incorporating the limited flow valve. Other designs and uses will be obvious to those skilled in the art. Additionally, it will be apparent to those skilled in the art, that the valve dimensions can be altered to allow for more or less liquid to be dispensed.

What is claimed is:

1. A container for dispensing a predetermined amount of liquid through a dispensing tube, said container having:
   a. a vessel, said vessel having at least one side, an open end and a base;
   b. a valve, said valve having at least one side, a height, a dispensing tube inlet and a fluid inlet port, said valve being adjacent to said base in a position to receive liquid through said fluid inlet port, said inlet port being offset from said base's center point and adjacent to said at least one side;
   c. a dispensing tube, said dispensing tube having a first end and a second end, said first end being in contact with said dispensing tube inlet and said second end exiting said vessel through a lid said dispensing tube further having an air hole, said air hole being proximate said dispensing tube second end and exterior of said vessel, and having sufficient surface to prevent suction of said liquid through said dispensing tube;
   d. a lid, said lid being in sealable contact with said open end and having a dispensing tube receiving port dimensioned to receive said dispensing tube;
   e. at least one vent hole, said vent hole being in said lid and providing air flow into said container;
   f. a drinking shield, at least a portion of said drinking shield having an interior dimensioned to receive and enclose said dispensing tube, a base and an exterior configured to facilitate drinking, said drinking shield being affixed to said lid;

wherein said valve is dimensioned to contain a predetermined about of liquid, said liquid being in fluid contact with said inlet port when said base is in a first position and out of fluid contact with said inlet port when said base is in a second position, said predetermined amount of liquid retained within said valve being delivered through said dispensing tube.

2. A container for dispensing no more than a predetermined amount of liquid directly into a user's mouth through a dispensing conduit, said container comprising:
   a) a vessel, said vessel having at least one side, and a closed top end, and a base end, said base end being fixed to said at least one side to form a liquid enclosure,
   b) a valve, said valve having a liquid containing region and an inlet, said liquid containing region being dimensioned to contain a predetermined volume of liquid,
   c) a dispensing conduit, said dispensing conduit having a first region and a second region, said first region being a tubular member positioned within said vessel and being in fluid communication with said valve liquid containing region, said dispensing conduit second region extending from said vessel closed end and having an outlet end,
   d) a dispensing conduit vent, said vent being between said vessel closed top end and said dispensing conduit outlet end,
   whereby the user is unable to siphon liquid from said vessel by sucking liquid through said dispensing conduit.

3. The container of claim 2, wherein said dispensing conduit second region further comprises an elongated tubular portion and a shield portion, said shield portion being positioned proximate said tubular portion, said vent being in at least one of said tubular portion second region and said shield portion of said dispensing conduit.

4. The container of claim 3, wherein said shield portion encloses said elongated tubular portion exterior and is fixed thereto.

5. The container of claim 4, wherein said vent is an air passage that extends external of said shield, between said shield portion and said tubular portion, to said dispensing conduit outlet end, that air passage provides air communication between ambient air and the users mouth, whereby the user is unable to siphon liquid from said vessel by sucking liquid through said dispensing conduit.

6. The container of claim 4, wherein said vent is an opening in said tubular portion, whereby the user is unable to siphon liquid from said vessel by sucking liquid through said dispensing conduit.

7. The container of claim 4, wherein said shield portion overlies and is spaced from said tubular portion, and wherein said shield extends beyond said tubular portion, whereby a user is prevented from blocking said vent in said tubular exterior region.

8. The container of claim 7, wherein said shield has at least one vent opening.

9. The container of claim 2, wherein said dispensing conduit first region has an interior volume that is less than about 25% of the combined volume of said dispensing conduit first region and said valve liquid containing region.

10. The container of claim 3, further comprising a lid, said closed end being closed by said lid, said lid being in sealable contact with said container and having a dispensing conduit receiving port dimensioned to receive said dispensing conduit.

11. The container of claim 10 wherein said drinking shield is formed integrally with said lid.

12. The method of dispensing from a container a measured amount of liquid through a dispensing conduit into a user's mouth, said container comprising a vessel, a valve and a dispensing conduit, said method comprising the steps of, a) filling a vessel with a predetermined amount of liquid, said vessel having at least one side, and a top closed end, and a base, said base being fixed to said at least one side to form a liquid enclosure, said vessel housing said valve and said valve having a liquid containing region and a valve inlet, said liquid containing region being dimensioned to contain said predetermined volume of liquid, a dispensing conduit having a first end and a second end, said first end being in fluid communication with said valve liquid containing region, said dispensing conduit extending through said vessel closed end and having said second end spaced from said vessel closed end, said dispensing conduit having a vent, said vent being between said vessel closed end and said dispensing conduit second end, b) rotating said container from a first upright position to a second position, in said second position said valve inlet being above the level of said liquid, and c) dispensing no more than a measured volume of liquid from said valve liquid containing region, through said dispensing conduit second end to said user's mouth.

13. The method of claim 12, wherein the relationship of the height of liquid in step (a), the position of said valve in said container, and said conduit second end is such that when said container is rotated toward said second position, dispensing does not commence until said valve inlet is at least substantially at the level of said liquid.

14. The method of claim 12, wherein said dispensing conduit further comprises an elongated tubular portion and a shield portion, said dispensing conduit elongated tubular portion having an interior region positioned within said vessel and an exterior region positioned external of said vessel, said shield portion being positioned proximate said tubular portion exterior region, said vent being in at least one of said tubular portion exterior region and shield portion of said dispensing conduit, and further comprising the step of providing air flow through said vent, between ambient air and the users mouth, whereby the user is unable to siphon liquid from said vessel by sucking liquid through said dispensing conduit.

15. The method of claim 14, further comprising the step of precluding the user from sucking liquid through said dispensing conduit, by providing air flow commencing external of said shield, between said shield and said tubular portion exterior region, to said dispensing conduit outlet end, such that said air passage provides air communication between ambient air and the users mouth.

* * * * *